Patented May 8, 1951

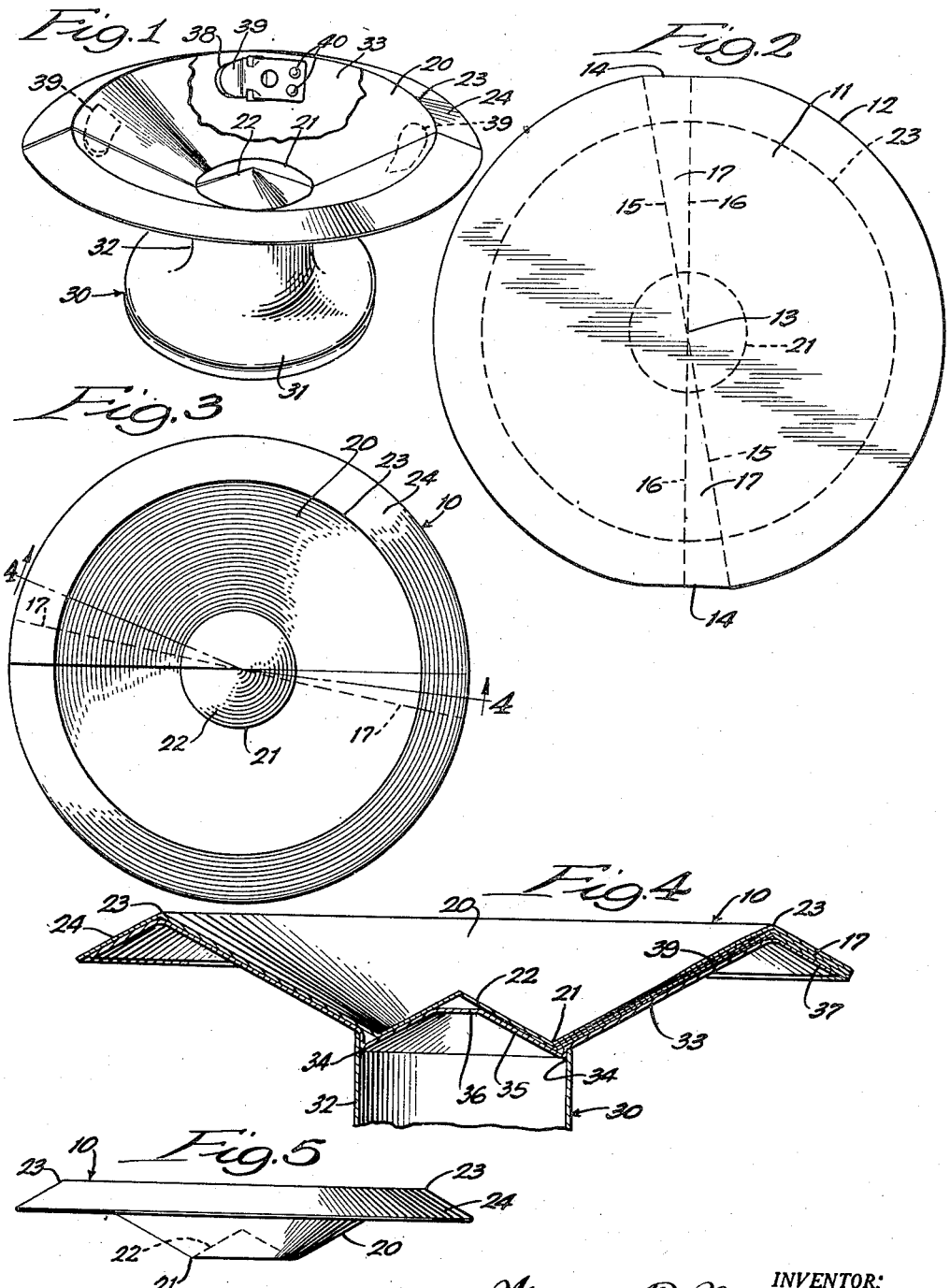

2,552,051

UNITED STATES PATENT OFFICE 2,552,051

PAPER SUNDAE DISH

Walter P. Margulies, New York, N. Y., assignor, by mesne assignments, to Lily-Tulip Cup Corporation, a corporation of Delaware Application June 7, 1949, Serial No. 97,604

2 Claims. (Cl. 229—1.5)

This invention is directed to paper sundae dishes.

Paper sundae dishes heretofore provided for use with dish holders have been substantially completely conical in form and as a result the ice cream and sauce or topping placed therein all gravitate toward the conical apex of the sundae dish. It is therefore practically impossible in such sundae dishes properly to locate the ice cream and sauce or topping therein and retain the same in proper locations. They run together and intermingle to produce an unappealing and often an unpleasant and unappetizing effect.

The principal object of the invention is to provide an improved paper sundae dish which is substantially conical in form, which obviates the aforementioned difficulties encountered with conventional conical paper sundae dishes, which prevents gravitation of the ice cream and sauce or topping toward the conical apex of the sundae dish, which properly locates the ice cream and sauce or topping in the sundae dish and retains the same in proper positions therein, which produces an appealing, pleasant and appetizing effect, and which may be readily and inexpensively manufactured.

In carrying out the object of the invention the improved conical paper sundae dish comprises a frustro-conical side wall merging at its smaller end in a reverse conical hump and preferably the cone angles of the side wall and the hump are obtuse and substantially the same. The conical hump eliminates the usual conical apex of the sundae dish and forms a support for the ice cream placed therein. A single scoop of ice cream may be placed directly on the conical hump and be firmly supported thereby or a plurality of scoops of ice cream may be spaced about the conical hump. In the latter event the conical hump provides for proper location of the scoops of ice cream and supports the same in such proper locations without excessive intermingling of the same. The conical hump also provides a barrier to prevent undue intermingling or mixing of the sauces or toppings applied over the ice cream. A pleasing, appealing and appetizing sundae may thus be prepared in the sundae dish of this invention.

The sundae dish of this invention is also preferably provided with a frustro-conical peripheral skirt at the larger end of the frustro-conical side wall of the sundae dish to prevent overflow or drippings from the sundae in the sundae dish from dirtying the holder for the sundae dish. Also, the sundae dish of this invention is preferably provided with external folded flaps or plaits by which the sundae dish may be automatically received in and secured in the holder therefor.

Other objects and advantages of this invention will become apparent to those skilled in the art upon reference to the accompanying specification, claims and drawing in which:

Figure 1 is a perspective view of the paper sundae dish of this invention secured in a holder therefor, a portion of the sundae dish being broken away for clarity;

Figure 2 is a plan view of the paper blank for forming the sundae dish;

Figure 3 is a top plan view of the sundae dish illustrated in Fig. 1;

Figure 4 is an enlarged sectional view taken substantially along the line 4—4 of Fig. 3 showing the sundae dish secured in the holder and Figure 5 is a side elevational view of the sundae dish illustrated in Fig. 3.

The sundae dish of this invention is generally designated at 10 and it may be formed from a paper blank 11 as illustrated in Fig. 2. The paper blank is substantially circular in configuration having circumferential edges 12 having a common center 13, and parallel straight side edges 14 forming chords of the circumference 12. The substantially straight side edges 14 are utilized so that the blanks may be cut from a narrower strip of paper thereby reducing to a great extent the amount of waste in cutting the blanks. The blank is folded along fold lines 15 and 16 to provide external diametrically opposed external flaps or plaits 17 and to form the blank into a conical formation. Preferably two flaps or plaits are utilized.

The conical paper dish thus formed has a frustro-conical side wall 20 which merges at its smaller end at 21 into a reverse conical hump 22. This reverse conical hump 22 may be formed by reversing or forming inwardly by means of suitable dies the normal apex of the conical dish. The larger end of the frustro-conical side wall 20 of the sundae dish merges at 23 with a frustro-conical peripheral skirt 24. The skirt 24 is preferably formed with forming dies which bend downwardly the outer portion of the conical dish at 23.

The cone angles of the side wall, conical hump and skirt are all obtuse and preferably are in the neighborhood of substantially 122°. Since the conical hump and the frustro-conical skirt are formed from the same conical dish, the cone angles of the side wall, conical hump and skirt are substantially the same. Since the cone directions of the conical hump, the side wall and the skirt reverse at the lines 21 and 23, unfolding of the flaps or plaits 17 is effectively prevented so that the paper sundae dish of this invention is firmly retained in shape.

The sundae dish 10 of this invention is adapted to be utilized in conjunction with a holder generally designated at 30. The holder includes a base 31 provided with a neck 32 to which is secured a frustro-conical receptacle 33 as by means of welding 34. The frustro-conical receptacle 33 operates to support the side wall 20 of the paper sundae dish and is provided with a reverse conical hump 35 to support the reverse conical hump 22 of the sundae dish. The top of the hump 35 may be flattened out as at 36 to assure that the conical hump 22 of the sundae dish may fit closely the hump 35 of the holder. The larger end of the receptacle 33 of the holder is also provided with a skirt 37 for supporting the peripheral skirt 24 of the paper sundae dish.

The conical receptacle portion 33 of the holder 30 is provided with a plurality of holes 38, preferably four in number, and overlying each hole is a spring finger 39 carried by rivets 40. Opposed spring fingers 39 are adapted to engage under the external opposed folded flaps 17 of the sundae dish for securing the sundae dish in the holder. When the holder is placed over an inverted stack of sundae dishes and is rotated to cause the fingers 39 to move under the folded flaps or plaits of the top sundae dish, the sundae dish is automatically gripped by the holder and may be removed by means of the holder from the inverted stack. The fingers 39 in addition to automatically removing the sundae dish from a stack of dishes also operates firmly to secure the removed sundae dish in the holder. Because the sundae dish utilizes a pair of opposed folded flaps or plaits and the holder utilizes two pairs of opposed spring fingers, it is only necessary to rotate the holder a maximum of substantially 90° automatically to grip and remove a sundae dish from a stack of sundae dishes.

While for purposes of illustration, one form of this invention has been disclosed, other forms thereof may become apparent to those skilled in the art upon reference to this disclosure, and therefore, this invention is to be limited only by the scope of the appended claims.

I claim:

1. A one piece conical paper sundae dish formed from a substantially circular paper blank and provided with only two diametrically opposed folded plaits extending from the center of the dish to the edge thereof with the side creases of the plaits extending diametrically through the center and having a frustro-conical side wall merging at its smaller end in a reverse conical hump, the cone angles of the side wall and the hump being obtuse and substantially the same.

2. A one piece conical paper sundae dish formed from a substantial circular paper blank and provided with only two diametrically opposed folded plaits extending from the center of the dish to the edge thereof with the side creases of the plaits extending diametrically through the center and having a frustro-conical side wall merging at its smaller end in a reverse conical hump and merging at its larger end in a reverse frustro-conical peripheral skirt, the cone angles of the side wall, the hump and the skirt being obtuse and substantially the same.

WALTER P. MARGULIES.

REFERENCES CITED

The following references are of record in the file of this patent:

UNITED STATES PATENTS

| Number | Name | Date |
|---|---|---|
| 1,257,949 | Adelson | Feb. 26, 1918 |
| 1,280,416 | Curtin | Oct. 1, 1918 |
| 1,997,429 | Paige | Apr. 9, 1935 |
| 2,224,129 | Amberg | Dec. 10, 1940 |
| 2,352,393 | Lee | June 27, 1944 |